US012476032B2

(12) United States Patent
Lin et al.

(10) Patent No.: US 12,476,032 B2
(45) Date of Patent: Nov. 18, 2025

(54) INDUCTIVE DEVICE

(71) Applicant: SANTAK ELECTRONIC (SHENZHEN) CO., LTD., Shenzhen (CN)

(72) Inventors: Pingchang Lin, Shenzhen (CN); Jian Wei, Shenzhen (CN); Jindi Liu, Shenzhen (CN); Ping Zhang, Shenzhen (CN)

(73) Assignee: SANTAK ELECTRONIC (SHENZHEN) CO., LTD., Shenzhen (CN)

( * ) Notice: Subject to any disclaimer, the term of this patent is extended or adjusted under 35 U.S.C. 154(b) by 1017 days.

(21) Appl. No.: 17/246,963

(22) Filed: May 3, 2021

(65) Prior Publication Data

US 2021/0350965 A1 Nov. 11, 2021

(30) Foreign Application Priority Data

May 9, 2020 (CN) ......................... 202020752366.5

(51) Int. Cl.

| | |
|---|---|
| ***H01F 27/28*** | (2006.01) |
| ***H01F 17/04*** | (2006.01) |
| ***H01F 27/29*** | (2006.01) |
| ***H01F 27/32*** | (2006.01) |

(52) U.S. Cl.
CPC ........... *H01F 17/045* (2013.01); *H01F 27/29* (2013.01); *H01F 27/324* (2013.01)

(58) Field of Classification Search
CPC ...... H01F 17/045; H01F 27/29; H01F 27/324; H01F 27/306; H01F 27/325; H01F 37/00
USPC ......................... 336/192, 221, 198, 5, 60–65
See application file for complete search history.

(56) References Cited

U.S. PATENT DOCUMENTS

| | | | | |
|---|---|---|---|---|
| 5,175,525 | A * | 12/1992 | Smith | H01F 27/2866 336/83 |
| 5,793,273 | A * | 8/1998 | Yamaguchi | H01F 27/027 336/212 |
| 9,343,223 | B2 * | 5/2016 | Suzuki | H01F 27/306 |
| 2013/0154782 | A1 * | 6/2013 | Won | H01F 27/29 242/430 |
| 2016/0133379 | A1 * | 5/2016 | Lin | H01F 27/30 336/198 |
| 2016/0217916 | A1 * | 7/2016 | Yan | H01F 27/22 |
| 2017/0278622 | A1 * | 9/2017 | Chen | H01F 27/306 |
| 2021/0304948 | A1 * | 9/2021 | Yoshikawa | H01F 27/24 |

* cited by examiner

*Primary Examiner* — Shawki S Ismail
*Assistant Examiner* — Kazi S Hossain
(74) *Attorney, Agent, or Firm* — Stanek Lemon Crouse & Meeks, PA

(57) ABSTRACT

The utility model provides an inductive device, including a columnar magnetic core provided with grooves on side surfaces thereof; a frame assembly including embedding portions adapted to the grooves in shape, the embedding portions being embedded in the grooves; and an inductive coil wound onto the side surfaces of the columnar magnetic core. The inductive device of the utility model has the advantages of saved winding use amount and prolonged service life.

16 Claims, 9 Drawing Sheets

INDUCTIVE DEVICE

CROSS-REFERENCE TO RELATED APPLICATIONS

The present application claims priority to Chinese Patent Application No. 202020752366.5; filed May 9, 2020, entitled INDUCTIVE DEVICE, the disclosure of which is incorporated herein by reference in its entirety.

TECHNICAL FIELD

The utility model relates to the field of electronic components, in particular to an inductive device.

BACKGROUND

As an indispensable electronic component in a power system, an inductive device in the existing technology includes a magnetic core, a frame supporting the magnetic core, and a coil wound onto the magnetic core.

However, the inductive device in the existing technology has the following defects: the magnetic core is in a cuboid shape, and edges thereof have sharp folded corners, so that in the process of winding the coil onto the magnetic core, a large force may cause the coil to experience excessive local pressure at the sharp corners of the magnetic core, resulting in stress damage of the coil, thus shortening the service life of the inductor. The coil cannot be closely attached to the side surface of the magnetic core, increasing the length and cost of the winding and the resistance of the inductive device. The frames used to support the magnetic core in the inductive device may increase the overall size of the inductive device, reducing the space utilization rate thereof. In addition, inductive devices with many different characteristics cannot be manufactured by modular design.

SUMMARY

In view of the above technical problems existing in the existing technology, the utility model provides an inductive device, including a columnar magnetic core provided with grooves on side surfaces thereof; a frame assembly including embedding portions adapted to the grooves in shape, the embedding portions being embedded in the grooves; and an inductive coil wound onto the side surfaces of the columnar magnetic core.

Preferably, the columnar magnetic core includes a first side surface and a second side surface which are respectively connected with both sides of the groove, an outer side wall of the embedding portion being smoothly connected with the first side surface and the second side surface of the columnar magnetic core.

Preferably, the outer side wall of the embedding portion is tangent to the first side surface and the second side surface of the columnar magnetic core.

Preferably, the groove includes a first side wall and a second side wall, and the embedding portion includes a first embedding surface parallel to and attached to the first side wall of the groove, and a second embedding surface parallel to and attached to the second side wall of the groove.

Preferably, an included angle between the first side wall and the second side wall of the groove is 30°-150°.

Preferably, the inductive coil includes a first connection terminal, a second connection terminal and a multi-turn coil connected between the first connection terminal and the second connection terminal, each turn of the multi-turn coil including straight portions closely attached to the side surfaces of the columnar magnetic core and bending portions closely attached to the outer side walls of the embedding portions.

Preferably, the frame assembly includes a first frame and a second frame which are oppositely arranged, where the first frame and the second frame are identical, and the first frame and the second frame are respectively abutted against the two oppositely arranged side surfaces of the columnar magnetic core.

Preferably, the columnar magnetic core includes a first end surface and a second end surface which are oppositely arranged, and the first frame includes two oppositely arranged joint portions and two oppositely arranged embedding portions. The two embedding portions are located between the two joint portions and are fixedly connected with the two joint portions, and the two joint portions are respectively attached to the first end surface and the second end surface of the columnar magnetic core.

Preferably, each of the two joint portions includes an joint portion outer plate and an joint portion inner plate which are oppositely arranged, and a plurality of joint portion transverse plates fixed between the joint portion outer plate and the joint portion inner plate.

Preferably, each of the two embedding portions includes an arc-shaped panel and a plurality of sector-shaped transverse baffles fixed to the arc-shaped panel, an arc-shaped outer side wall of the arc-shaped panel of each of the two embedding portions forms an outer side wall of a corresponding embedding portion, and the sector-shaped transverse baffles are embedded in the groove and arranged in parallel in an extending direction of the groove.

Preferably, each of the two joint portions is provided with a support plate at one end, and the support plates of the first frame and the second frame are located on the same plane.

Preferably, each of the two joint portions is provided with a through hole at the other end, and the inductive device further includes coil fixing rings penetrating through the through holes.

Preferably, the inductive device further includes cylindrical insulation paper with two open ends, the insulation paper being wrapped on the side surfaces of the columnar magnetic core and the outer side wall of the embedding portions.

Preferably, the frame assembly includes a hollow first frame and a hollow second frame, where the first frame and the second frame are sleeved on the columnar magnetic core from both ends, and the inductive coil is located between the first frame and the second frame.

Preferably, the first frame and the second frame are identical. The second frame includes a hollow second frame body having an inner side wall and an outer side wall, and a plurality of support plates fixed to the outer side wall of the second frame body, where the embedding portions are fixed to the inner side wall of the second frame body.

Preferably, the columnar magnetic core includes a plurality of side surfaces and curved surfaces smoothly connecting any two adjacent side surfaces of the plurality of side surfaces.

The frame assembly of the inductive device of the utility model is embedded in the grooves on the side surfaces of the magnetic core, and the side surfaces of the magnetic core forms a smooth circular arc surface, so that the inductive coil can be tightly wound onto the magnetic core, thus saving the usage amount and cost of the winding, prolonging the service life of the inductive device and reducing the volume of the inductive device.

BRIEF SUMMARY OF THE DRAWINGS

Embodiments of the utility model will be further described below in detail with reference to the accompanying drawings, in which.

DETAILED DESCRIPTION

In order to make the objectives, technical schemes and advantages of the utility model clearer, the utility model will be further explained in detail by way of specific embodiments with reference to the accompanying drawings.

Figure 1:
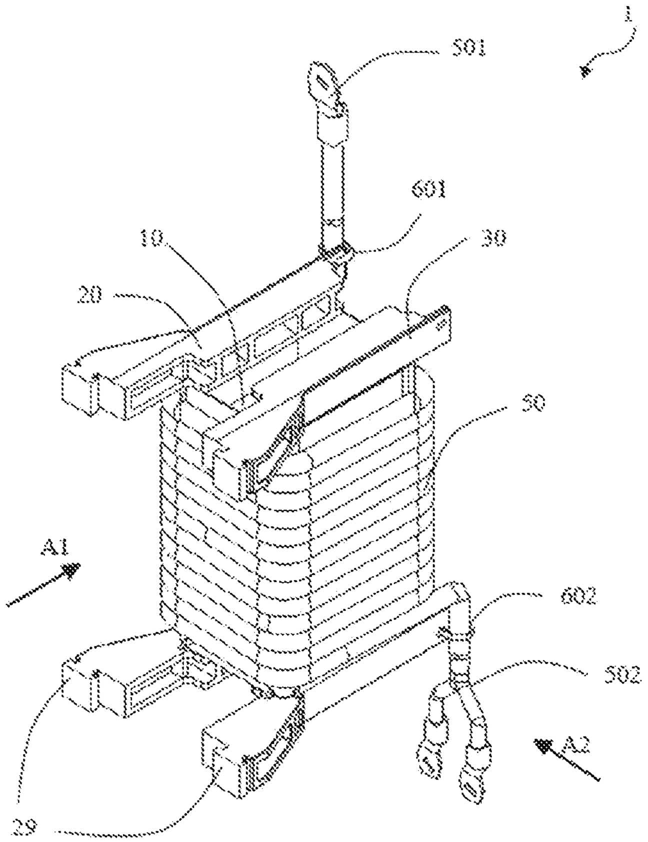
FIG. 1 is a schematic perspective view of an inductive device according to a first embodiment of the utility model.

FIG. 1 is a schematic perspective view of an inductive device according to a first embodiment of the utility model. As shown in FIG. 1, the inductive device 1 is in a cuboid shape in general, and includes a magnetic core 10, a frame assembly 29 embedded in a groove (described in detail below with reference to FIG. 4) on a side surface of the magnetic core 10, and an inductive coil 50 wound onto the frame assembly 29 and the side surface of the magnetic core 10.

The frame assembly 29 includes a first frame 20 and a second frame 30 which are located on two opposite sides of the magnetic core 10. The inductive coil 50 includes a first connection terminal 501 and a second connection terminal 502 which extend in opposite directions, where the second connection terminal 502 is preferably provided with two connection pins. The inductive device 1 further includes a coil fixing ring 261 for fixing the first connection terminal 501 of the coil 50 to the first frame 20, and a coil fixing ring 361 for fixing the second connection terminal 502 of the coil 50 to the second frame 30.

Figure 2:
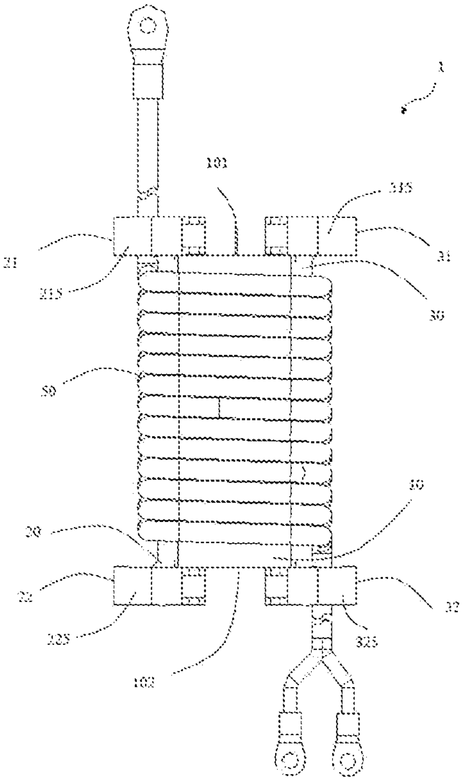
FIG. 2 is a schematic plan view of the inductive device shown in FIG. 1 as viewed in a direction indicated by arrow A1.
Figure 3:
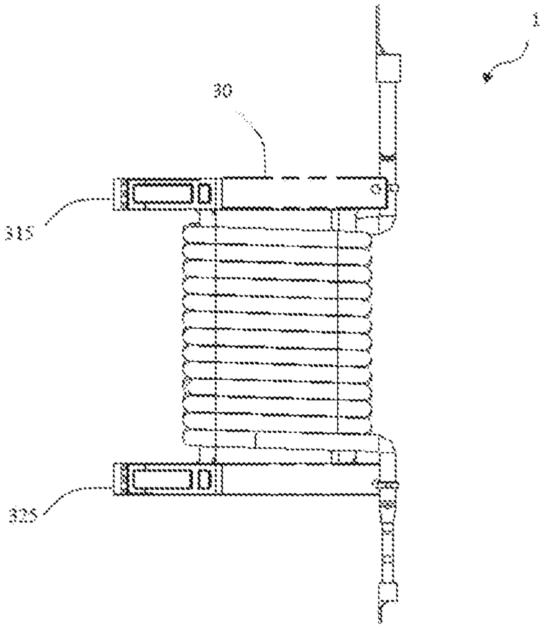
FIG. 3 is a schematic plan view of the inductive device shown in FIG. 1 as viewed in a direction indicated by arrow A2.

FIG. 2 is a schematic plan view of the inductive device shown in FIG. 1 as viewed in a direction indicated by arrow A1. FIG. 3 is a schematic plan view of the inductive device shown in FIG. 1 as viewed in a direction indicated by arrow A2, with the first frame 20 shielded by the second frame 30. As shown in FIG. 2 and FIG. 3, the magnetic core 10 includes a first end surface 101 and a second end surface 102 which are oppositely arranged. The first frame 20 includes an joint portion 21 and an joint portion 22 which are oppositely arranged, and the second frame 30 includes an joint portion 31 and an joint portion 32 which are oppositely arranged. The joint portion 21 of the first frame 20 and the joint portion 31 of the second frame 30 are located on the first end surface 101 of the magnetic core 10, and the joint portion 22 of the first frame 20 and the joint portion 32 of the second frame 30 are located on the second end surface 102 of the magnetic core 10. Therefore, the magnetic core 10 is firmly sandwiched between the first frame 20 and the second frame 30. The ends of the joint portions 21 and 22 of the first frame 20 are provided with support plates 215, 225 respectively, and the ends of the joint portions 31, 32 of the second frame 30 are provided with support plates 315, 325 respectively. The support plates 215, 225 and the support plates 315, 325 are located on the same plane, so that the inductive device 1 can be stably placed on a horizontal plane by taking this plane as a support plane.

Figure 4:
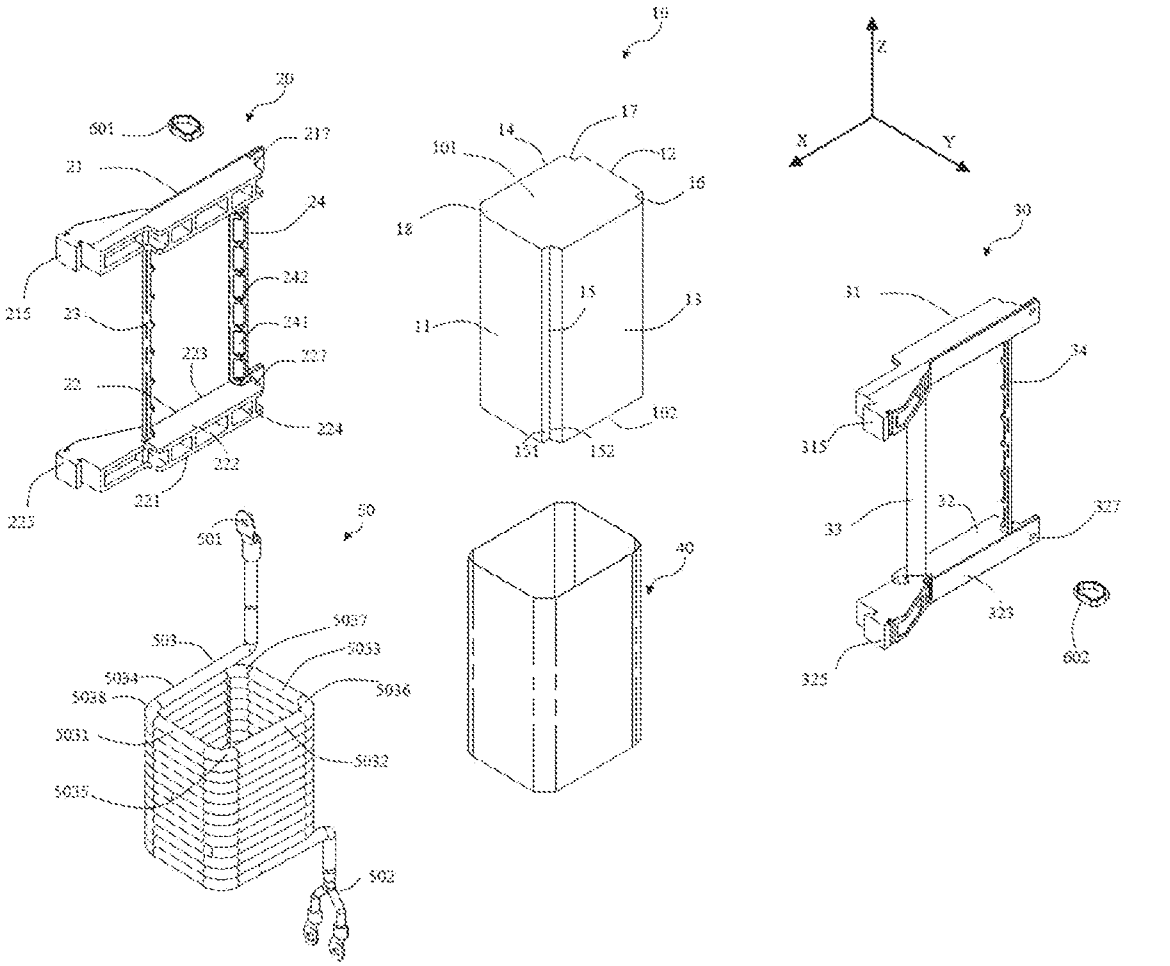
FIG. 4 is an exploded view of the inductive device shown in FIG. 1.

FIG. 4 is an exploded view of the inductive device shown in FIG. 1. As shown in FIG. 4, the magnetic core 10 is in a columnar shape, and includes a first side surface 11 and a second side surface 12 (FIG. 4 only shows one side thereof) which are oppositely arranged, a third side surface 13 and a fourth side surface 14 (FIG. 4 only shows one side thereof) which are oppositely arranged. The magnetic core 10 is provided grooves 15, 16, 17, 18 on side surfaces thereof, where the groove 15 is located between the first side surface 11 and the third side surface 13, the groove 16 is located between the third side surface 13 and the second side surface 12, the groove 17 is located between the second side surface 12 and the fourth side surface 14, and the groove 18 is located between the fourth side surface 14 and the first side surface 11.

In order to facilitate the description of the inductive device 1, it is defined herein that the X direction is the direction perpendicular to the first side surface 11, the Y direction is the direction perpendicular to the third side surface 13, and the Z direction is the direction perpendicular to the first end surface 101, where the Z direction is perpendicular to the X direction and the Y direction.

The grooves 15, 16, 17 and 18 on the side surface of the magnetic core 10 have the same shape, and only the groove 15 will be described here as an example. The groove 15 extends longitudinally along the entire length of the magnetic core 10, that is, extends from the second end surface 102 to the first end surface 101 in the Z direction. The groove 15 has a first side wall 151 and a second side wall 152 which are parallel to the Z direction, the first side wall 151 intersects the first side surface 11, and the second side wall 152 intersects the third side surface 13. Preferably, the first side wall 151 and the second side wall 152 intersect to form an angle equal to or approximately equal to 90°. In the process of manufacturing the magnetic core 10, a cuboid magnetic core material is manufactured first, and then four edges of the cuboid magnetic core material are cut inward to form the grooves 15, 16, 17, 18 on the side surfaces of the magnetic core 10.

The first frame 20 and the second frame 30 have the same shape and are oppositely arranged, and only the first frame 20 will be described here as an example. The first frame 20 may be made of a pressure-resistant, high-temperature-resistant insulation material, preferably made of plastic or glass fiber through integral molding. The first frame 20 has a substantially square-shaped frame structure, and includes an joint portion 21 and an joint portion 22 arranged opposite and parallel to each other, and an embedding portion 23 and an embedding portion 24 arranged opposite and parallel to each other. The embedding portion 23 and the embedding portion 24 are located between and fixedly connected with the joint portion 21 and the joint portion 22.

The embedding portion 23 and the embedding portion 24 of the first frame 20 are respectively adapted to the grooves 18 and 17 in shape, and are suitable to be embedded in an accommodation space defined by the grooves 18 and 17. The embedding portion 23 and the embedding portion 24 have the same structure, and only the embedding portion 24 will be described here as an example. The embedding portion 24 includes an arc-shaped panel 241 extending in the Z direction, and a plurality of sector-shaped transverse baffles 242 fixed to the arc-shaped panel 241. The size (i.e. length) of the arc-shaped panel 241 in the Z direction is substantially equal to the length of the magnetic core 10 (i.e. the distance between the first end surface 101 and the second end surface 102). Thus, the distance between the joint portion 21 and the joint portion 22 fixed at both ends of the arc-shaped panel 241 is equal to the length of the magnetic core 10, so that the magnetic core 10 is clamped between the joint portion 21 and the joint portion 22 of the first frame 20. The plurality of sector-shaped transverse baffles 242 are parallel to one another and are arranged at certain intervals in the Z direction. Each sector-shaped transverse baffle 242 includes two embedding surfaces and an arc-shaped surface, where the arc-shaped surface is fixedly connected to an arc-shaped inner side wall of the arc-shaped panel 241.

The joint portion 21 and the joint portion 22 have the same shape, and only the joint portion 22 will be described here as an example. The joint portion 22 includes an joint portion outer plate 221 and an joint portion inner plate 222 which are oppositely arranged, an joint portion side plate 223 and a plurality of joint portion transverse plates 224, which are located between the joint portion outer plate 221 and the joint portion inner plate 222, and a support plate 225 fixedly connected with one end of each of the joint portion outer plate 221 and the joint portion inner plate 222. The joint portion inner plate 222 is parallel to the second end surface 102 of the magnetic core 10, and is used to be closely attached to the second end surface 102 of the magnetic core 10. The plurality of joint portion transverse plates 224 are fixedly connected between the joint portion outer plate 221 and the joint portion inner plate 222, so that the joint portion 22 has sufficient support strength, and weight and costs are greatly reduced at the same time. The joint portion side plate 223 is provided with a through hole 227 at the end away from the support plate 225. Similarly, the joint portion side plate of the joint portion 21 is provided with a through hole 217 at the end away from the support plate 215. After penetrating through the through hole 217, the coil fixing ring 261 is used to fix the first connection terminal 501 of the coil 50 to the joint portion 21. The two support plates 215, 225 on the first frame 20 and the two support plates 315, 325 on the second frame 30 are all perpendicular to the X direction and located on the same plane, so as to support the magnetic core 10 and allow the inductive device 1 to rest stably on the horizontal plane.

The insulation paper 40 is made of a flexible insulation material, and is in a cylindrical shape with two open ends. The size (i.e., length) of the insulation paper 40 in the Z direction is equal to the length of the magnetic core 10. The insulation paper 40 is wound or wrapped onto an outer side wall of the magnetic core 10 to isolate the magnetic core 10 from the coil 50 wound onto the magnetic core 10, thereby improving the insulation performance.

The inductive coil 50 includes a first connection terminal 501, a second connection terminal 502, and a multi-turn coil 503 connected between the first connection terminal 501 and the second connection terminal 502. The inductive coil 50 is wound onto the magnetic core 10 and outer side walls of the embedding portions 23, 24, 33 and 34 embedded in the four grooves 15, 16, 17 and 18 of the magnetic core 10 in the same rotating direction, so as to firmly wind the magnetic core 10, the first frame 20 and the third frame 30 together. Each turn of the multi-turn coil 503 is closely attached to the four side surfaces 11, 12, 13 and 14 of the magnetic core 10 and the outer side walls of the embedding portions 23, 24, 33 and 34, so that each turn of the coil 503 includes four straight portions 5031, 5032, 5033 and 5034 and bending portions 5035, 5036, 5037 and 5038 connected between every two adjacent straight portions.

Figure 5:
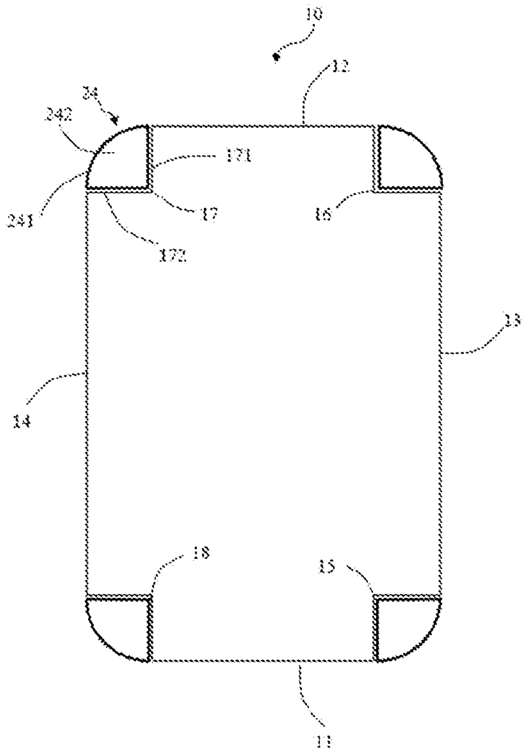
FIG. 5 is a schematic plan view of the magnetic core and the embedding portions of the frame assembly shown in FIG. 4 as viewed in a Z direction after being assembled together.

FIG. 5 is a schematic plan view of the magnetic core and the embedding portions of the frames shown in FIG. 2 as viewed in the Z direction after being assembled. Here, only the embedding portion 24 of the first frame 20 and the corresponding groove 17 will be described as an example. As shown in FIG. 5, the embedding portion 24 is adapted to the groove 17 in shape and is embedded in the groove 17. The first side surface 11 and the third side surface 13 of the magnetic core 10 are respectively tangent to an arc-shaped outer side wall of the arc-shaped panel 241 of the embedding portion 24, thus the arc-shaped panel 241 allows the adjacent first side surface 11 and third side surface 13 of the magnetic core 10 to be smoothly connected. An included angle formed by the two embedding surfaces of the sector-shaped transverse baffle 242 of the embedding portion 24 is equal to an included angle formed by a first side wall 171 and a second side wall 172 of the groove 17. When the embedding portion 24 is embedded into the groove 17, the two embedding surfaces of the sector-shaped transverse baffle 242 are respectively parallel to and closely attached to the first side wall 171 and the second side wall 172 of the groove 17. On the one hand, the embedding portion 24 is firmly embedded in the groove 17 of the magnetic core 10 to fix and snap-fit the magnetic core 10, and on the other hand, the magnetic core 10 and the frame assembly occupy a smaller space after being assembled.

An assembling process of the inductive device 1 will be briefly described below in conjunction with FIG. 4. First, the embedding portions 23, 24 of the first frame 20 are embedded into the grooves 18, 17 of the magnetic core 10, the embedding portions 33, 34 of the second frame 30 are embedded into grooves 15, 16 of the magnetic core 10, and the insulation paper 40 is wrapped onto the assembled magnetic core 10 and the outer side walls of embedding portions 23, 24, 33 and 34. Then, the inductive coil 50 is wound tightly onto the insulation paper 40 around the magnetic core 10 and the outer side walls of the embedding portions embedded in the four grooves of the magnetic core 10, so that the insulation paper 40, the magnetic core 10, the first frame 20 and the second frame 30 are wound together.

Finally, the coil fixing ring 261 is penetrated through the through hole 217 to fix the first connection terminal 501 of the inductive coil 50 to the first frame 20, and the coil fixing ring 361 is penetrated through the through hole 327 at the end of the joint portion side plate 323 of the joint portion 32 to fix the second connection terminal 502 of the inductive coil 50 to the second frame 30.

In the process of assembling the inductive device 1 described above, there is no need to assemble the magnetic core 10 and the first frame 20 and the second frame 30 together by methods such as bolt connection, snap connection, glue connection and welding and the like, improving cost efficiency.

Since there are no sharp corners after the magnetic core 10 and the embedding portions 23, 24, 33 and 34 of the frame assembly 29 are assembled together, in the winding process, the contact force of the winding is distributed more uniformly, so the problem of stress damage caused by local concentrated stress of the winding is avoided, a large winding force may be set without damaging the winding due to sharp corners, and the winding is more closely wound and attached to the magnetic core 10 and the outer side walls of the embedding portions 23, 24, 33, 34. Therefore, the use amount of winding used is significantly saved, the resistance of the inductive device 1 is reduced, the electrical performance of the inductive device 1 is improved, heat generated by the resistor of the coil is also reduced, and low power consumption and high cost efficiency are achieved.

The arc-shaped panels of the embedding portions are tangent to the side surfaces of the magnetic core 10, so that the inductive coil 50 can be closely attached to the side surfaces of the magnetic core 10 and the outer side walls of the arc-shaped panels of the embedding portions simultaneously, further reducing the stress of the bending portions of the inductive coil 50 at the grooves of the magnetic core 10.

The embedding portions of the frame assembly 29 are embedded in the grooves of the magnetic core 10, so that the volume of the inductive device 1 is not increased, while the overall spatial integration of the inductive device 1 is significantly improved, and the size of the magnetic core 10 is not reduced and then the inductance performance thereof is not lost.

The two intersecting embedding surfaces of each sector-shaped transverse baffle of the embedding portions are parallel to the first side wall and the second side wall of each groove respectively, and are closely attached to the first side wall and the second side wall, so that the embedding portions of the frame assembly are firmly embedded in the grooves of the magnetic core.

The first frame 20 and the second frame 30 of the inductive device 1 are identical, so they can be integrally manufactured using the same mold, thereby reducing the manufacturing costs. In addition, misassembly can be avoided in the process of installing the inductive device 1.

Figure 6:
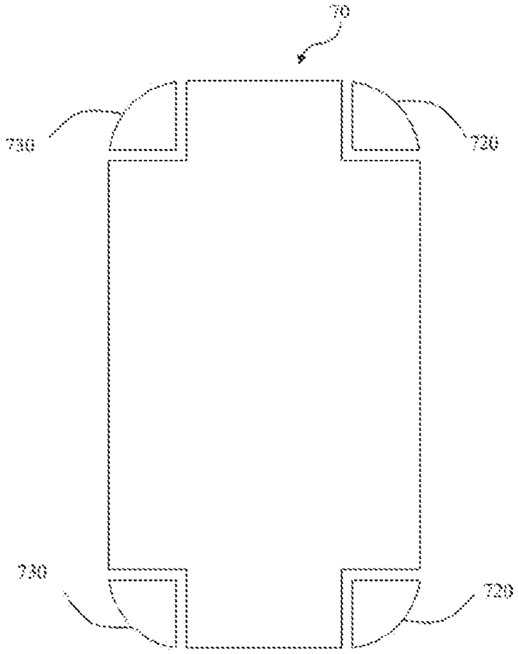
FIG. 6 is a schematic plan view of the magnetic core and the embedding portions of the frame assembly of the inductive device according to a second embodiment of the utility model as viewed in the Z direction after being assembled together.

FIG. 6 is a schematic plan view of the magnetic core and the embedding portions of the frames of the inductive device according to a second embodiment of the utility model as viewed in the Z direction after being assembled together. As shown in FIG. 6, a first frame 720 and a second frame 730 are identical to the first frame 20 and the second frame 30 shown in FIG. 5, except that the width of the magnetic core 70 between the first frame 720 and the second frame 730 is smaller than the width of the magnetic core 10 between the first frame 20 and the second frame 30 shown in FIG. 5.

The two separate first and second frames of the frame assembly can be embedded in grooves on the side surfaces of the magnetic cores with different widths, so the width of the magnetic core can be designed according to needs, so as to produce inductive devices with different electrical properties without having to develop new molds and manufacture frame assemblies. Therefore, the inductive device of the utility model is suitable for modular manufacturing and reduces manufacturing costs. In addition, the number of turns of the inductive coil wound onto the side surfaces of the magnetic core may be changed according to actual needs, so that inductive devices with different electrical properties can be obtained.

Figure 7:
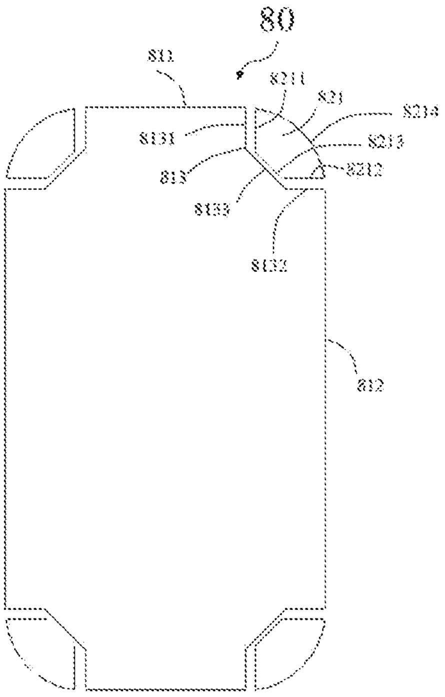
FIG. 7 is a schematic plan view of the magnetic core and the embedding portions of the frame assembly of the inductive device according to a third embodiment of the utility model as viewed in the Z direction after being assembled together.

FIG. 7 is a schematic plan view of the magnetic core and the embedding portions of the frames of the inductive device according to a third embodiment of the utility model as viewed in the Z direction after being assembled together. FIG. 7 is basically the same as FIG. 6, except that the groove 813 on the side surface of the magnetic core 80 has a first side wall 8131, a second side wall 8132, and a third side wall 8133 located between the first side wall 8131 and the second side wall 8132. The embedding portion 821 adapted to the groove 813 in shape is in a columnar shape. The embedding portion 821 has a first embedding surface 8211, a second embedding surface 8212 and a third embedding surface 8213 respectively parallel and adapted to the first side wall 8131, the second side wall 8132, and the third side wall 8133 of the groove 813, and a curved surface 8214 connecting the first embedding surface 8211 and the second embedding surface 8212, where the curved surface 8214 of the embedding portion 821 allows one side surface 811 of the magnetic core 80 to be smoothly connected to an adjacent side surface 812.

Figure 8:
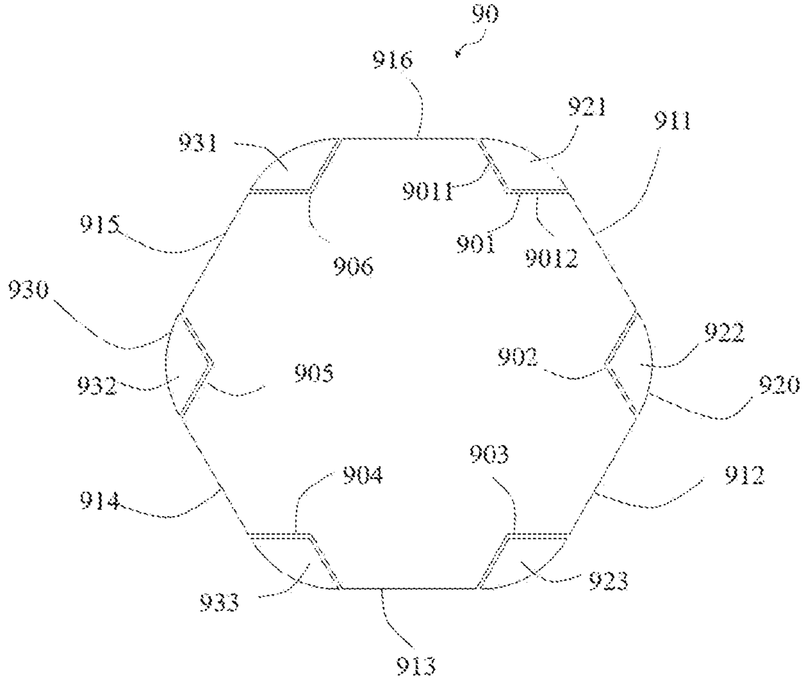
FIG. 8 is a schematic plan view of the magnetic core and the embedding portions of the frame assembly of the inductive device according to a fourth embodiment of the utility model as viewed in the Z direction after being assembled together.

FIG. 8 is a schematic plan view of the magnetic core and the embedding portions of the frames of the inductive device according to a fourth embodiment of the utility model as viewed in the Z direction after being assembled. As shown in FIG. 8, the magnetic core 90, the first frame 920 and the second frame 930 are basically the same as the magnetic core 10, the first frame 20 and the second frame 30 shown in FIG. 5, except that the magnetic core 90 is in a hexagonal shape in general, includes a first side surface 911, a second side surface 912, a third side surface 913, a fourth side surface 914, a fifth side surface 915, a sixth side surface 916, and grooves 901, 902, 903, 904, 905 and 906 located between two adjacent side surfaces. The grooves 901 to 906 preferably have the same shape, where an included angle between a first side wall 9011 and a second side wall 9012 of the groove 901 is 120°. The first frame 920 includes an embedding portion 921, an embedding portion 922 and an embedding portion 923 respectively adapted to the groove 901, the groove 902 and the groove 903. Similarly, the second frame 930 includes an embedding portion 931, an embedding portion 932 and an embedding portion 933 respectively adapted to the groove 906, the groove 905 and the groove 904.

According to still another aspect of the utility model, the magnetic core of the inductive device in the embodiment has the same structure as the magnetic core 90 shown in FIG. 8, except that the frame assembly includes three frames, and each frame includes two embedding portions which are adapted to the grooves on the side surfaces of the magnetic core in shape.

According to another aspect of the utility model, the magnetic core of the inductive device in the embodiment has the same structure as the magnetic core 90 shown in FIG. 8, except that the frame assembly includes three frames, and each frame includes two embedding portions which are adapted to the grooves on the side surfaces of the magnetic core in shape.

In other embodiments of the utility model, the included angle between the first side wall and the second side wall of each groove on the side surfaces of the columnar magnetic core 10, 70 and 80 is 30°-150°, preferably 60°-120°.

In other embodiments of the utility model, each groove on the side surfaces of the columnar magnetic core 10, 70, 80 has more than three connected side walls, each embedding portion of the frame assembly is adapted to the groove in shape, and accordingly, the embedding portion has a plurality of embedding surfaces which are attached to the side walls of the corresponding groove.

In other embodiments of the utility model, an joint portion of the first frame 20 and/or the second frame 30 is of a solid rod structure.

Figure 9:
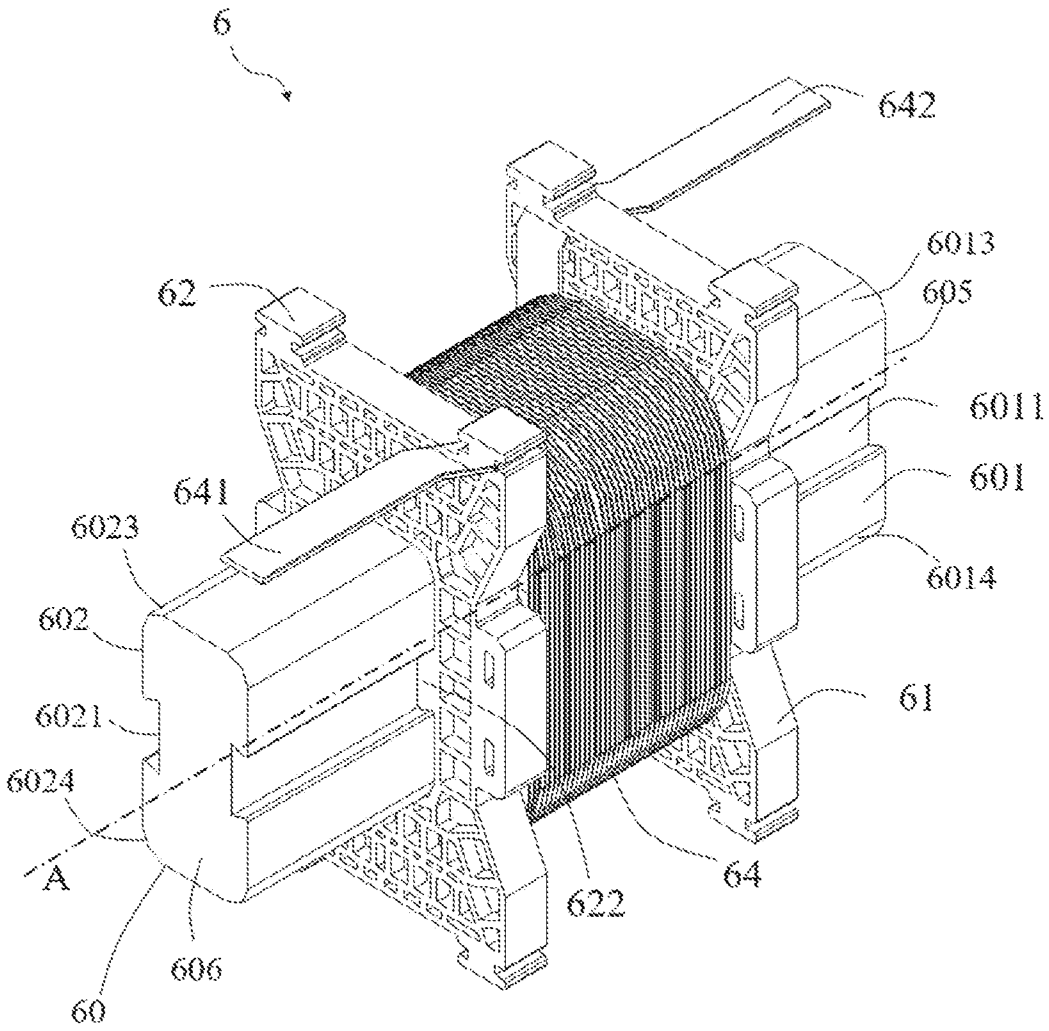
FIG. 9 is a schematic perspective view of an inductive device according to a fifth embodiment of the utility model.

FIG. 9 is a schematic perspective view of an inductive device according to a fifth embodiment of the utility model. As shown in FIG. 9, the inductive device 6 includes a columnar magnetic core 60, an inductive coil 64 wound onto a side surface of the magnetic core 60, and a first frame 61 and a second frame 62 which are oppositely arranged.

The magnetic core 60 is in a columnar shape and has an axis A. The magnetic core 60 includes a first end surface 605 (FIG. 9 only shows one side thereof) and a second end surface 606 which are oppositely arranged, a first side surface 601 and a second side surface 602 (FIG. 9 only shows one side thereof) which are oppositely arranged, a third side surface 603 and a fourth side surface 604 (FIG. 9 only shows one side thereof) which are oppositely arranged, a cambered surface 6013 smoothly connecting the first side surface 601 and the third side surface 603, a cambered surface 6014 smoothly connecting the first side surface 601 and the fourth side surface 604, a cambered surface 6023 smoothly connecting the second side surface 602 and the third side surface 603, and a cambered surface 6024 (FIG. 9 only shows one side thereof) smoothly connecting the second side surface 602 and the fourth side surface 604. The magnetic core 60 is provided with a groove 6011 on the first side surface 601, and is provided with a groove 6021 on the second side surface 602. The groove 6011 and the groove 6021 are oppositely arranged and have the same shape. The groove 6011 extends from the first end surface 605 to the second end surface 606 in a direction parallel to the axis A.

The inductive coil 64 is formed by winding a flat wire onto the side surfaces of the magnetic core 60, and has a first wire outlet end 641 and a second wire outlet end 642, where the first wire outlet end 641 and the second wire outlet end 642 extend in opposite directions.

The first frame 61 and the second frame 62 are in an annular shape and sleeved on the magnetic core 60. The first frame 61 and the second frame 62 are located at the two opposite ends of the inductive coil 64 and sandwich the inductive coil 64 therebetween. The first frame 61 and the second frame 62 are provided with embedding portions on inner side walls, and only one embedding portion 622 of the second frame 62 is shown in FIG. 9. The embedding portion 622 is adapted to the groove 6011 on the side surface of the magnetic core 60 in shape and is embedded in the groove 6011.

Figure 10:
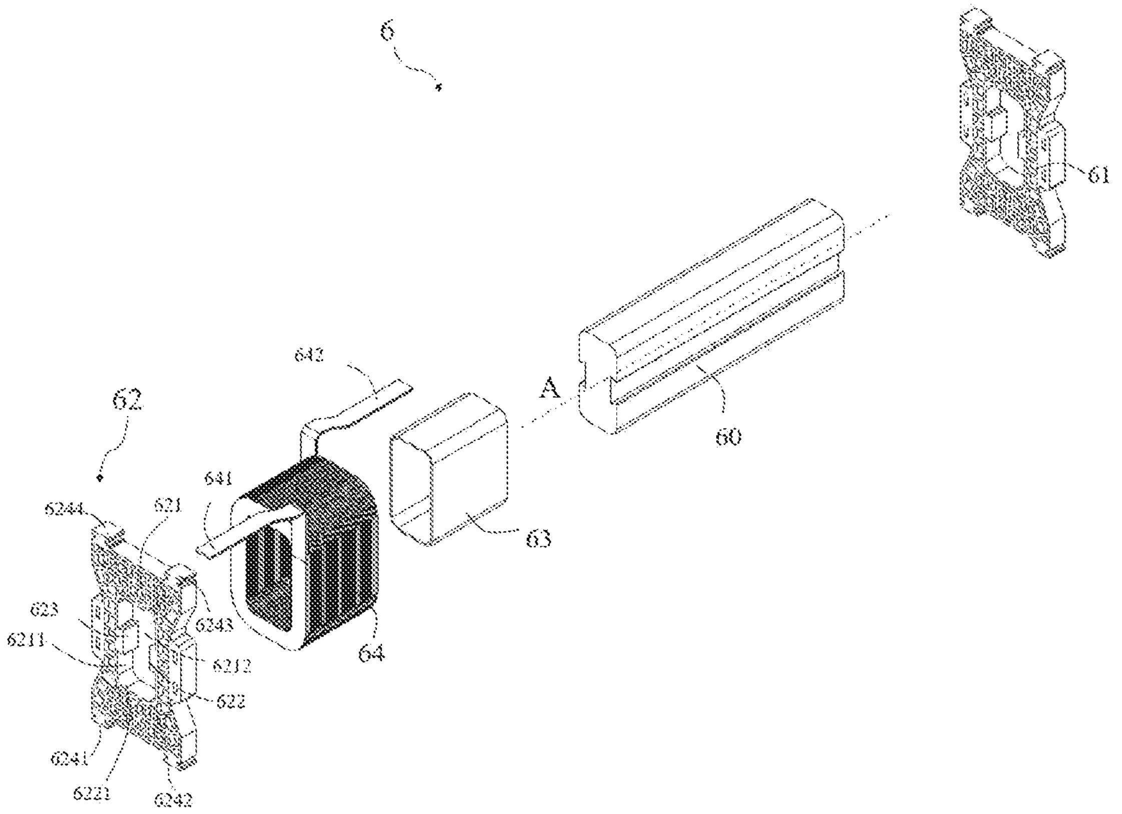
FIG. 10 is an exploded view of the inductive device 6 shown in FIG. 9.

FIG. 10 is an exploded view of the inductive device 6 shown in FIG. 9. As shown in FIG. 10, the inductive device 6 further includes tubular or cylindrical insulation paper 63 with two open ends. The insulation paper 63 is sleeved or wrapped onto the outer side walls of the magnetic core 60 to isolate the magnetic core 60 from the inductive coil 64, so as to improve the insulation performance.

The first frame 61 and the second frame 62 have the same shape and are symmetrically arranged, and only the second frame 62 will be described here as an example. The second frame 62 is of a hollow frame structure in general, and is preferably made of an insulation material through integral molding. The second frame 62 includes a hollow second frame body 621, embedding portions 622 and 623 fixed to the second frame body 621, and support plates 6241, 6242, 6243, 6244.

The second frame body 621 includes an inner side wall 6211 defining a magnetic core accommodation space 6212 for accommodating a portion of the magnetic core 60.

The embedding portions 622 and 623 are oppositely arranged and fixed to the inner side wall 6211 of the second frame body 621. The embedding portions 622 and 623 are adapted to the grooves 6011 and 6021 on the side surfaces of the magnetic core 60 in shape, and are suitable to be embedded in the grooves 6011 and 6021 in a direction parallel to the axis A of the magnetic core 60, respectively.

The support plates 6241, 6242, 6243, 6244 are fixed to an outer side wall of the second frame body 621, where the support plates 6241 and 6242 are located on a same plane, and the support plates 6243 and 6244 are located on a same plane.

Figure 11:
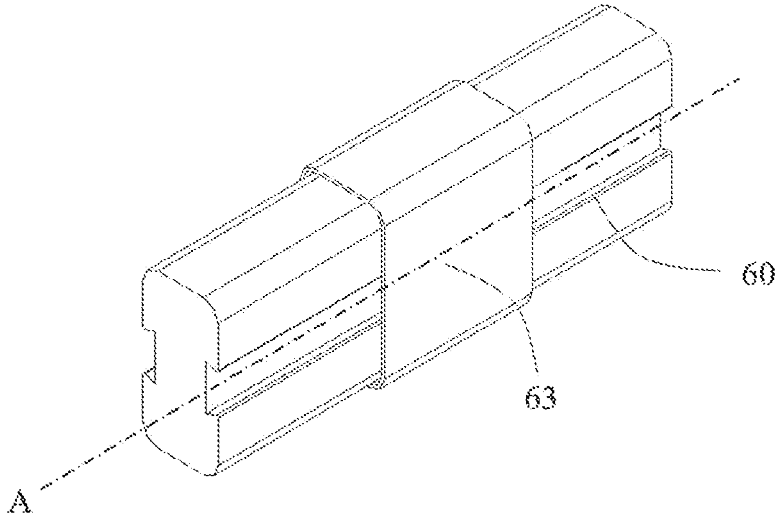
FIGS. 11 to 15 are schematic perspective views showing a assembling process of the inductive device shown in FIG. 9.
Figure 12:
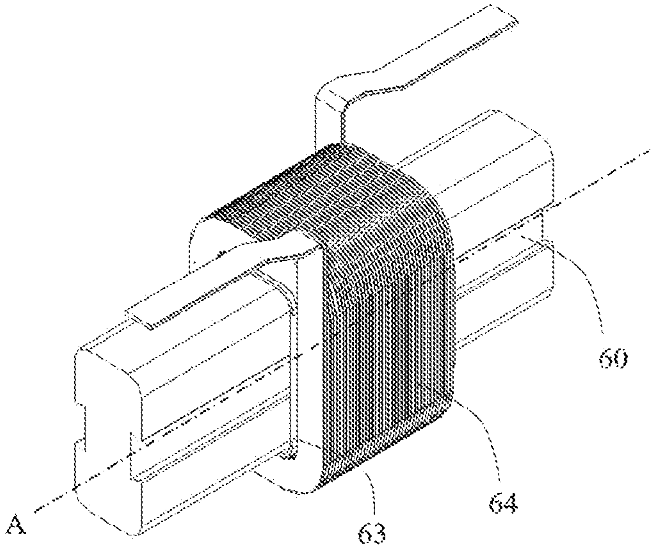
Figure 13:
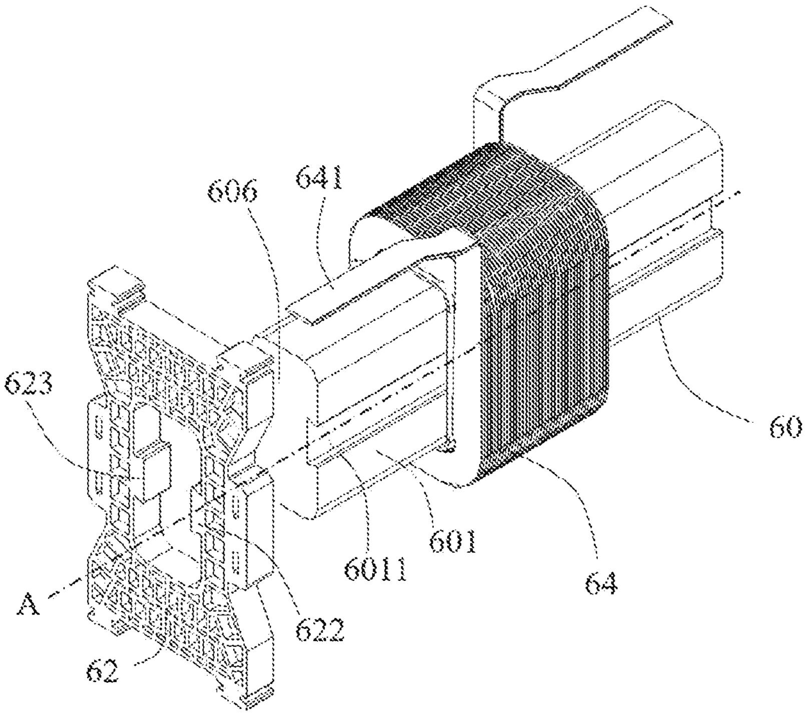
Figure 14:
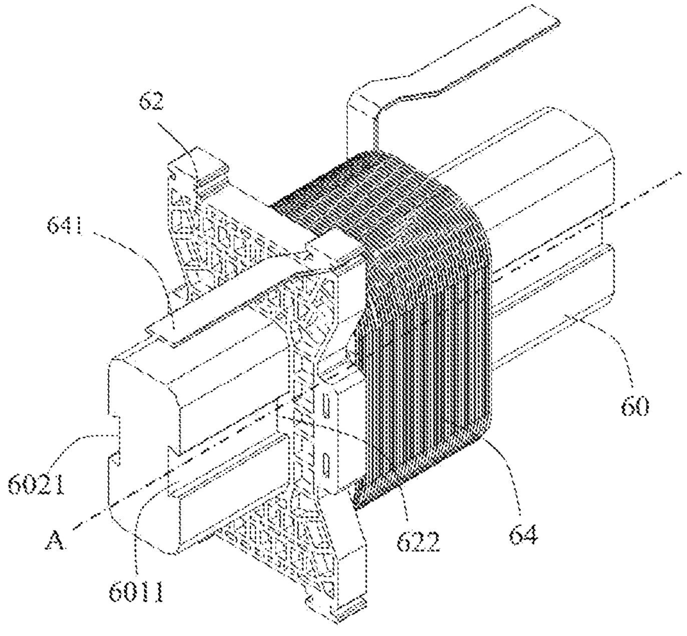
Figure 15:
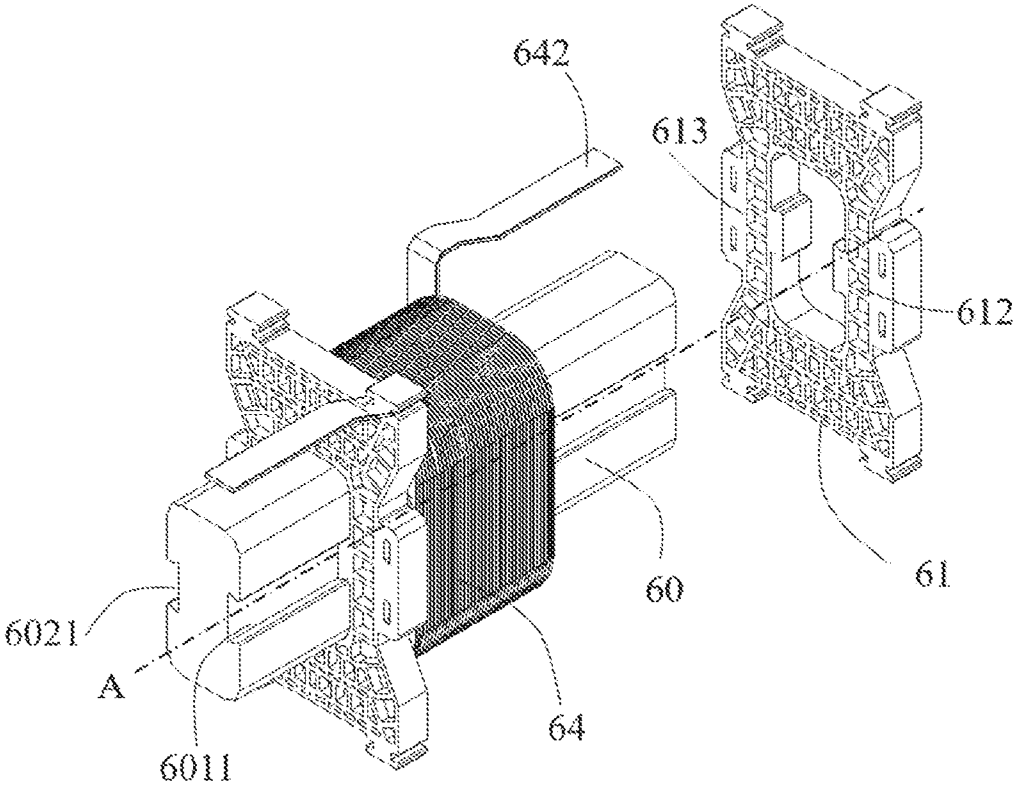

FIGS. 11 to 15 are schematic perspective views showing an assembling process of the inductive device shown in FIG. 9. The assembling process of the inductive device 6 will be briefly described with reference to FIGS. 11 to 15. As shown in FIG. 11, the insulation paper 63 is sleeved on the magnetic core 60 along the axis A of the magnetic core 60. As shown in FIG. 12, the inductive coil 64 is sleeved on the insulation paper 63 or a flat wire is wound onto the side surfaces of the magnetic core 60 around the axis A of the magnetic core 60 to form the inductive coil 64, where the insulation paper 63 is located between the magnetic core 60 and the inductive coil 64. As shown in FIG. 13, the embedding portions 622 and 623 of the second frame 62 are aligned with the grooves 6011 and 6021 (not shown in FIG. 13) of the magnetic core 60 in a direction parallel to the axis A, respectively. As shown in FIG. 14, the second frame 62 is sleeved on the magnetic core 60 along the axis A of the magnetic core 60, and the embedding portion 622 and embedding portion 623 (not shown in FIG. 14) of the second frame 62 are embedded in the grooves 6011 and 6021 of the magnetic core 60, respectively. As shown in FIG. 15, the embedding portions 612 and 613 of the first frame 61 are aligned with the grooves 6011 and 6021 of the magnetic core 60 in a direction parallel to the axis A, respectively. Finally, the first frame 61 is sleeved on the magnetic core 60 along the axis A of the magnetic core 60, and the embedding portions 612 and 613 of the first frame 61 are embedded in the grooves 6011 and 6021 of the magnetic core 60, respectively, thereby completing the assembling process to obtain the inductive device 6 as shown in FIG. 9.

The embedding portions of the first frame 61 and the second frame 62 are embedded in the grooves on the side surfaces of the magnetic core 60, so that the first frame 61, the second frame 62 and the magnetic core 60 can be connected together without additional clamping components.

The first frame 61 and the second frame 62 are separate components and are arranged on two opposite sides of the inductive coil 64, so the number of turns of the inductive coil 64 can be designed as required to obtain inductive devices with different inductance parameters, and manufacturing costs can be reduced.

A smooth cambered surface is provided between two adjacent side surfaces of the magnetic core 60. Similarly, each turn of the multi-turn coil of the inductive coil 64 includes a bending portion which is closely attached to the cambered surface of the magnetic core 60, so that the service life of the inductive device 6 is prolonged.

The support plates 6241, 6242 are located on the same plane, and the support plates 6243, 6244 are located on the same plane, so that the inductive device 6 can be stably placed on a horizontal plane.

In other embodiments of the utility model, the third side surface 603 and the fourth side surface 604 of the magnetic core 60 are provided with grooves extending in a direction parallel to the axis A. The number of grooves on each side surface of the magnetic core 60 may be greater than one. The inner side walls of the first frame 61 and the second frame 62 are provided with embedding portions adapted to the grooves on the third side surface 603 and the fourth side surfaces 604 of the magnetic core 60 in shape.

In another embodiment of the utility model, the grooves on the side surfaces of the magnetic core have different shapes or sizes.

In another embodiment of the utility model, the grooves on the side surfaces of the magnetic core have the shapes of concave arc, semicircle, sector, trapezoid, rectangle, polygon and the like.

The magnetic core of the utility model may be integrally formed or formed by combining a plurality of independent sub-magnetic cores.

The inductive device provided by the utility model may be applied to any occasion where an inductive coil is used, for example, used as reactor, choke coil, transformer coil, etc.

The utility model is described in accordance with preferred embodiments. However, the utility model is not limited to the embodiments described here. Various changes and variations made without departing from the scope of the utility model are included.

What is claimed is:

1. An inductive device, comprising:
- a columnar magnetic core provided with grooves along corners thereof;
- a frame comprising a first frame and a second frame, wherein each of the first frame and the second frame comprises two embedded frame portions, wherein the two embedded frame portions of each of the first frame and the second frame are embedded in respective first and second adjacent ones of the grooves; and
- an inductive coil wound on the columnar magnetic core and the embedded frame portions of the first frame and the second frame,
- wherein each embedded frame portion of the first frame and the second frame comprises a respective arc-shaped panel and a respective plurality of sector-shaped transverse baffles fixed to the respective arc-shaped panel,
- wherein each arc-shaped panel defines an arc-shaped outer side wall of a corresponding embedded frame portion, and
- wherein each respective plurality of sector-shaped transverse baffles is embedded in a groove corresponding to the respective embedded frame portion and is arranged in parallel in lengthwise direction of the groove.

2. The inductive device of claim 1, wherein the columnar magnetic core comprises a first side surface and a second side surface adjacent to one of the grooves, and wherein an outer side wall of at least one of the embedded frame portions disposed in the one of the grooves comprises a curved surface aligned with the first side surface and the second side surface of the columnar magnetic core.

3. The inductive device of claim 1, wherein each of the grooves comprises a first side wall and a second side wall, and each of the embedded frame portions comprises a first surface parallel to the first side wall of the groove, and a second surface parallel to the second side wall of the groove.

4. The inductive device of claim 1, wherein the inductive coil comprises a plurality of turns, each turn comprising first portions conforming to side surfaces of the columnar magnetic core and bending portions conforming to side walls of a respective embedded frame portion.

5. The inductive device of claim 1, wherein the first and second frames are identical and are disposed on different sides of the columnar magnetic core.

6. The inductive device of claim 1, wherein the frame is provided with a through hole, and the inductive device further comprises a coil fixing ring penetrating the through hole.

7. The inductive device of claim 1, wherein the inductive device further comprises an insulation paper on side surfaces of the columnar magnetic core and on each of the embedded frame portions of the frame.

8. An inductive device comprising:
- a magnetic core bar having respective grooves therein at respective corners where adjacent side surfaces of the magnetic core bar meet;
- a first frame on a first side of the magnetic core bar, wherein the first frame has a first embedded frame portion embedded in a first groove and a second embedded frame portion embedded in a second groove, and wherein the first groove is adjacent to the second groove;
- a second frame on a second side of the magnetic core bar, wherein the second frame has a first embedded frame portion embedded in a third groove and a second embedded frame portions embedded in a fourth groove, and wherein the third groove is adjacent to the fourth groove; and
- a coil wrapped around the magnetic core bar and the first and second embedded frame portions of the first and second frames.

9. The inductive device of claim 8, wherein the first and second embedded frame portions of the first and second frames have curved outer surfaces aligned with side surfaces of the magnetic core bar.

10. The inductive device of claim 8, wherein the first frame further comprises a first joining member that joins first ends of the first and second embedded frame portions of the first frame and a second joining member that joins second ends of the first and second embedded frame portions of the first frame, and wherein the coil is disposed between the first and second joining members.

11. The inductive device of claim 10, wherein the first and second frames are identical.

12. The inductive device of claim 8, wherein the first and second frames are disposed on opposite lateral sides of the magnetic core bar.

13. The inductive device of claim 8, wherein the inductive device comprises a third frame on a third side of the magnetic core bar and having first and second portions embedded in fifth and sixth adjacent ones of the grooves, and wherein the coil is wrapped around the magnetic core bar and the embedded portions of the first, second, and third frames.

14. The inductive device of claim 8, wherein the first and second embedded frame portions of the first frame are arranged opposite to each other, and the first frame further comprises first and second joint portions arranged opposite to each other, the first and second frame portions of the first frame being positioned between and fixedly connected to the first and second joint portions.

15. The inductive device of claim 14, wherein the first and second frame portions of the second frame are arranged opposite to each other, and the second frame further comprises third and fourth joint portions arranged opposite to each other, the first and second frame portions of the second frame being positioned between and fixedly connected to the third and fourth joint portions.

16. An inductive device comprising:

a magnetic core bar having respective grooves therein at respective corners where adjacent side surfaces of the magnetic core bar meet;

a first frame on a first side of the magnetic core bar and having first and second embedded portions embedded in first and second adjacent ones of the grooves;

a second frame on a second side of the magnetic core bar and having first and second embedded portions embedded in third and fourth adjacent ones of the grooves; and a coil wrapped around the magnetic core bar and the first and second embedded portions of the first and second frames, wherein each of the first and second embedded portions of the first and second frames comprises an arc-shaped panel and a plurality of sector-shaped transverse baffles fixed to the arc-shaped panel, wherein an arc-shaped outer side wall of the arc-shaped panel of each of the first and second embedded portions forms an outer side wall of a corresponding embedded portion, and wherein the sector-shaped transverse baffles are embedded in the groove corresponding to the respective embedded portion and are arranged in parallel in lengthwise direction of the groove.

* * * * *